(12) United States Patent
Baker et al.

(10) Patent No.: US 7,099,333 B2
(45) Date of Patent: Aug. 29, 2006

(54) AUTOMATIC PROTOCOL VERSION DETECTION AND CALL PROCESSING RECONFIGURATION IN A COMMUNICATION SYSTEM

(75) Inventors: Albert D. Baker, Lincroft, NJ (US); Eraj D. Kaluarachchi, South Orange, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 881 days.

(21) Appl. No.: 09/800,684

(22) Filed: Mar. 7, 2001

(65) Prior Publication Data

US 2002/0172220 A1    Nov. 21, 2002

(51) Int. Cl.
H04J 3/16 (2006.01)
H04L 12/28 (2006.01)
G06F 15/16 (2006.01)

(52) U.S. Cl. .............................. 370/395.5; 370/395.6; 370/401; 370/465; 709/230; 709/237; 709/250

(58) Field of Classification Search ............ 370/395.2, 370/395.7, 395.3, 395.52, 465, 466, 467, 370/395, 395.5, 395.6, 401; 709/236, 248, 709/221, 223, 230, 237, 250
See application file for complete search history.

(56) References Cited

U.S. PATENT DOCUMENTS

| | | | | |
|---|---|---|---|---|
| 5,949,782 A | * | 9/1999 | Wells | 370/395.2 |
| 6,009,097 A | * | 12/1999 | Han | 370/395.52 |
| 6,125,122 A | * | 9/2000 | Favichia et al. | 370/466 |
| 6,308,217 B1 | * | 10/2001 | Sasagawa | 709/236 |
| 6,351,465 B1 | * | 2/2002 | Han | 370/395.43 |
| 6,421,346 B1 | * | 7/2002 | Itoh et al. | 370/395.7 |
| 6,445,716 B1 | * | 9/2002 | Favichia et al. | 370/466 |
| 6,490,292 B1 | * | 12/2002 | Matsuzawa | 370/401 |
| 6,678,741 B1 | * | 1/2004 | Northcutt et al. | 709/248 |
| 6,714,544 B1 | * | 3/2004 | Bosloy et al. | 370/395.1 |
| 6,771,658 B1 | * | 8/2004 | Verbesselt et al. | 370/466 |
| 6,820,133 B1 | * | 11/2004 | Grove et al. | 709/238 |
| 6,845,091 B1 | * | 1/2005 | Ogier et al. | 370/338 |
| 2001/0032265 A1 | * | 10/2001 | Tanaka | 709/227 |

OTHER PUBLICATIONS

U.S. Appl. No. 09/503,042, filed Feb. 11, 2000, A.D. Baker et al.
ATM Forum, "ATM User-Network Interface (UNI) Signaling Specification," Version 4.0, 36 pages, Jul. 1996.

* cited by examiner

Primary Examiner—Alpus H. Hsu

(57) ABSTRACT

A switch or other processing element of a communication system is configured to detect automatically the particular version of an asynchronous transfer mode (ATM) user-network interface (UNI) protocol or other signaling protocol utilized by a customer premises equipment (CPE) device or other device coupled to the switch. The switch analyzes at least one message received in a signaling channel from the coupled device in order to determine the particular version of the protocol, and stores an indicator of the particular version of the protocol for use in subsequent interaction with the coupled device. Call processing functions of the switch may be reconfigured based at least in part on the determination of the particular protocol version.

16 Claims, 7 Drawing Sheets

AUTOMATIC PROTOCOL VERSION DETECTION AND CALL PROCESSING RECONFIGURATION IN A COMMUNICATION SYSTEM

FIELD OF THE INVENTION

The present invention relates generally to communication systems, such as systems including asynchronous transfer mode (ATM) connections or digital subscriber line (DSL) connections, and more particularly to techniques for automatically configuring elements of such systems for operation in accordance with particular signaling protocols.

BACKGROUND OF THE INVENTION

Conventional techniques for updating signaling protocols in communication system elements are problematic in that such techniques often require manual intervention by a system administrator or technician. For example, a generally accepted user-network interface (UNI) signaling protocol for ATM networks is the UNI 3.1 protocol, described in the reference specification ATM Forum, "ATM User-Network Interface Specification," Version 3.1, September 1994, which is incorporated by reference herein. However, newer, more advanced versions of this UNI signaling protocol are also available, such as, e.g., the UNI 4.0 version described in ATM Forum, "ATM User-Network Interface (UNI) Signaling Specification," Version 4.0, July 1996, which is incorporated by reference herein. In addition, previous developments in this area suggest that there will be further enhancements to these and other similar network signaling protocols in the future. Unfortunately, if an upgrade is made to the signaling protocol used by any terminal, switch or other piece of equipment connected to a given local switch of the system, it is currently necessary to also update the version of the signaling protocol in the local switch so as to match that of the attached equipment. As previously noted, this may require manual intervention by the system administrator or technician to update the version of the signaling protocol, e.g., in a system database associated with the local switch.

The need for the above-described updating approach is attributable to the fact that newer versions of the signaling protocol typically enable functions that allow new user features or support more effective operation of the system. For example, the ATM Forum UNI 3.1 signaling protocol is associated with a connection admission control function that allocates a requested amount of bandwidth at call establishment time, based on the contents of a control message (SETUP) that originates a call. If available, this amount of bandwidth is dedicated to that call instance for the duration of the call. However, the UNI 4.0 signaling protocol supports additional information, made available as part of the call establishment process, that can be used to negotiate the actual amount of bandwidth that the particular call instance will use. This latter amount of bandwidth may be smaller than the amount originally requested in the SETUP message, and in that case the connection admission control function can release the unused bandwidth back to the available pool for assignment to another call. This increases the level of bandwidth utilization efficiency for the system.

The updating problem is further complicated in that certain customer premises equipment (CPE) may run a variety of signaling protocol versions, e.g., UNI 3.1, UNI 4.0, etc., and may upgrade their protocol software without notification to their service provider. Such an upgrade can result in a logical capabilities mismatch between the CPE and its corresponding local switch.

Although many network elements may be configured to support an Integrated Local Management Information (ILMI) protocol to share management information between peer network elements, certain network elements may choose not to support the ILMI protocol or other similar information-sharing protocol. In situations in which there is no ILMI support or similar communication mechanism between the network and the CPE, information such as the protocol version generally must be manually administered, both at installation and update time.

In view of the foregoing, it is apparent that a need exists for improved techniques for managing updates of signaling protocols in communication system elements.

SUMMARY OF THE INVENTION

The present invention overcomes one or more of the above-noted problems of the prior art by providing techniques for automatic protocol version detection and call processing reconfiguration in a communication system.

In accordance with one aspect of the invention, a switch or other processing element of a communication system is configured to detect automatically the particular version of an asynchronous transfer mode (ATM) user-network interface (UNI) protocol or other signaling protocol utilized by a customer premises equipment (CPE) device or other device coupled to the switch. The switch analyzes at least one message received in a signaling channel from the coupled device in order to determine the particular version of the protocol, and stores an indicator of the particular version of the protocol for use in subsequent interaction with the coupled device.

In accordance with another aspect of the invention, a given message is analyzed by first determining if an information element identifier extracted from the message is a valid information identifier for a current protocol version associated with the second device in a memory of the first device, and if the extracted information element identifier is not a valid information identifier for the current protocol version, determining if the extracted information identifier is a valid information identifier for another version of the protocol.

In accordance with a further aspect of the invention, call processing functions of the switch may be reconfigured based at least in part on the determination of the particular protocol version. For example, a call processing function of the switch may be adjusted so as to provide for a given CPE device, or other device coupled to the switch, a feature associated with the particular version of the protocol.

Advantageously, the invention provides automated signaling protocol determination and corresponding communication system element reconfiguration which allows protocol version updates to be managed efficiently and without the need for manual intervention by a system administrator or technician.

These and other features and advantages of the present invention will become more apparent from the accompanying drawings and the following detailed description.

DETAILED DESCRIPTION OF THE INVENTION

The present invention will be illustrated below in conjunction with exemplary communication systems utilizing asynchronous transfer mode (ATM) signaling protocols such as the above-noted ATM Forum UNI 3.1 and UNI 4.0 protocols. It should be understood, however, that the disclosed techniques are suitable for use with a wide variety of other types of communication systems including, e.g., Frame Relay systems and IP systems, and with any desired type of communication medium, including asymmetric digital subscriber line (ADSL), synchronous optical network (Sonet)/synchronous digital hierarchy (SDH), wireless networks, etc. The invention may be used with any desired type of transport mechanism, communication link, or set of protocol variants. The term "call" as used herein should be understood to include any type of communication connection that may be established in one of the above-noted communication systems.

The present invention provides techniques for supporting variations in signaling protocols without the need for manual intervention. For example, in accordance with one aspect of the invention, signaling protocol version upgrades are detected by analysis of control channel message traffic, and switch call processing software is adjusted so as to properly accommodate different procedures related to alternate versions of the signaling protocol. In addition, the invention provides techniques for reconfiguration of call processing software based on a detected protocol version. Advantageously, the invention allows protocol version upgrades to be managed in an efficient manner, without the need for manual intervention by a system administrator or technician.

Figure 1A:
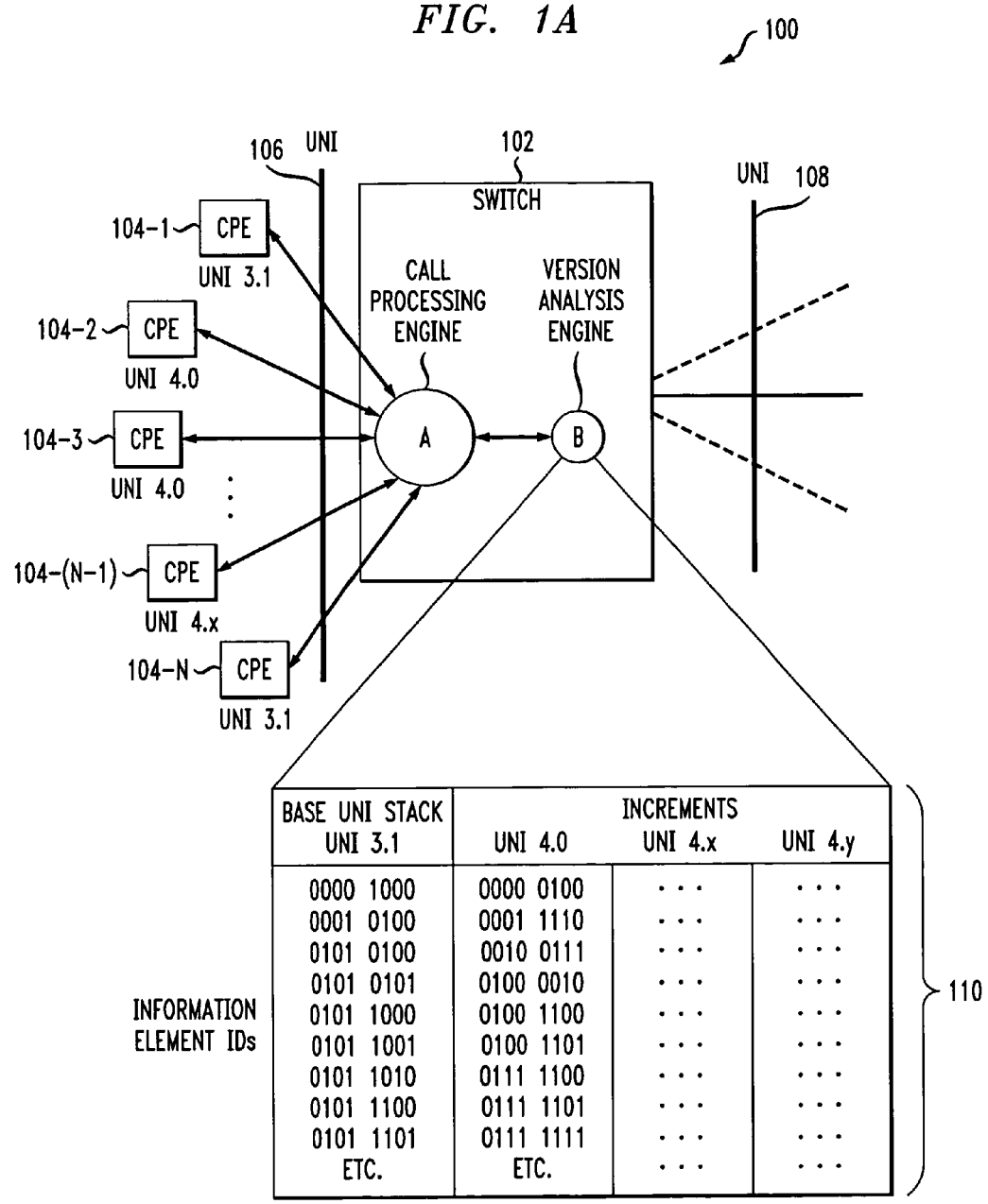
FIG. 1A is a block diagram of a portion of an exemplary communication system in which the invention is implemented.

FIG. 1A shows a portion of a communication system 100 configured in accordance with an illustrative embodiment of the invention. The system 100 includes a communication switch 102 and a set of N customer premises equipment (CPE) devices 104-i, i=1, 2, . . . N−1, N. The switch 102 communicates with the devices 104-i via a user-network interface 106. The switch 102 may be viewed as a local switch relative to the CPE devices 104-i, and also communicates with other network elements not shown in the figure, e.g., other switches, servers, CPE, etc., via a second user-network interface 108.

The switch 102 may be configured to include known communication processing functions. For example, the system 100 may be an ATM network, and the switch 102 may be a DSL access multiplexer (DSLAM). The term "switch" as used herein is thus intended to include multiplexing devices such as a DSLAM, as well as other types of network processing elements.

A given one of the CPE devices 104-i may comprise a conventional plain old telephone service (POTS) terminal, a wireless telephone, a desktop or portable personal computer (PC), a personal digital assistant (PDA), or any other type of device capable of communicating with switch 102 in system 100.

In accordance with the invention, the switch 102 in this embodiment includes processing elements denoted as A and B. Processing element A is a conventional call processing engine, and may be configured in a manner well known to those skilled in the art. Processing element B is coupled to processing element A and is a version analysis engine in accordance with the present invention. The operation of the version analysis engine will be described in greater detail below in conjunction with the flow diagram of FIG. 2A. The version analysis engine B includes, accesses or is otherwise associated with a system database 110.

It should be noted that system elements such as version analysis engine B that implement processing operations in accordance with the invention may be at least in part configured as software modules added to an otherwise conventional system switch.

The CPE devices 104-i operate with different versions of the ATM Forum user-network interface (UNI) signaling protocol. In this example, CPE devices 104-1 and 104-N operate with the UNI 3.1 protocol, CPE devices 104-2 and 104-3 operate with the UNI 4.0 protocol, and CPE device 104-(N−1) operates with a UNI 4.x protocol, which is assumed to be an upgrade of the UNI 4.0 protocol.

The switch 102 in the illustrative embodiment of FIG. 1A is configured to analyze control messages on signaling channels between itself and the CPE devices 104-i in order to detect and assert a specific version of the UNI signaling protocol, and then to activate the appropriate software elements to service that version type. In the FIG. 1A system, the switch 102 may assume that a given CPE device 104-i operates using a UNI 3.1 signaling protocol. Identifiers (IDs) of information elements associated with this default protocol version are listed in a base UNI stack column of a table of the system database 110, as shown in the figure. The table further includes a number of other columns, each including information element identifiers for other versions of the signaling protocol, e.g., UNI 4.0, UNI 4.x and UNI 4.y. Each of the identifiers shown in the table is in the form of a single octet, i.e., a group of eight bits, although it should be appreciated that this is not a requirement of the invention. In addition, it will be apparent to those skilled in the art that database 110 may include a variety of other elements, not shown in the figure, which are used in other switch processing functions and configured in a conventional manner.

The call processing engine A implements the different versions of the UNI protocol for a given CPE device 104-i as per a current version designated for that device in the system database 110. The version analysis engine B performs information element analysis in order to detect the current version of the UNI protocol for a given CPE device 104-i, and updates the system database with the current version as detected.

In operation, when the given CPE device 104-i initiates a call in the system 100, software associated with the call processing engine A of switch 102 will execute normal parsing procedures on the signaling channel messages according to the procedures and information elements defined for the UNI 3.1 signaling protocol. In the event that an information element not supported in the base UNI 3.1 protocol is detected, software associated with the version analysis engine B of switch 102 extracts the corresponding identifier information, and performs a lookup in the above-described table to determine the protocol version. If that identifier is not found, the software associated with the version analysis engine B initiates standard procedures for treatment of unknown information elements. If the information element is found, then the corresponding index is stored in the system database 110, or in another appropriate location within system 100, as the current protocol version for the associated CPE device 104-i. The current protocol version and the corresponding switch software that supports the features associated with that protocol version are then automatically activated for the port of the switch corresponding to CPE device 104-i.

It should be noted that certain protocol upgrades may involve changes in a control state machine or associated procedures utilized by the switch 102. Any such deviations from expected operations based on a protocol version stored for a given CPE device 104-i may be treated in the manner described above. For example, one or more attempts to determine an appropriate UNI protocol version may be made, with failure of the attempt resulting in normal condition handling, and success resulting in a system database update.

Figure 1B:
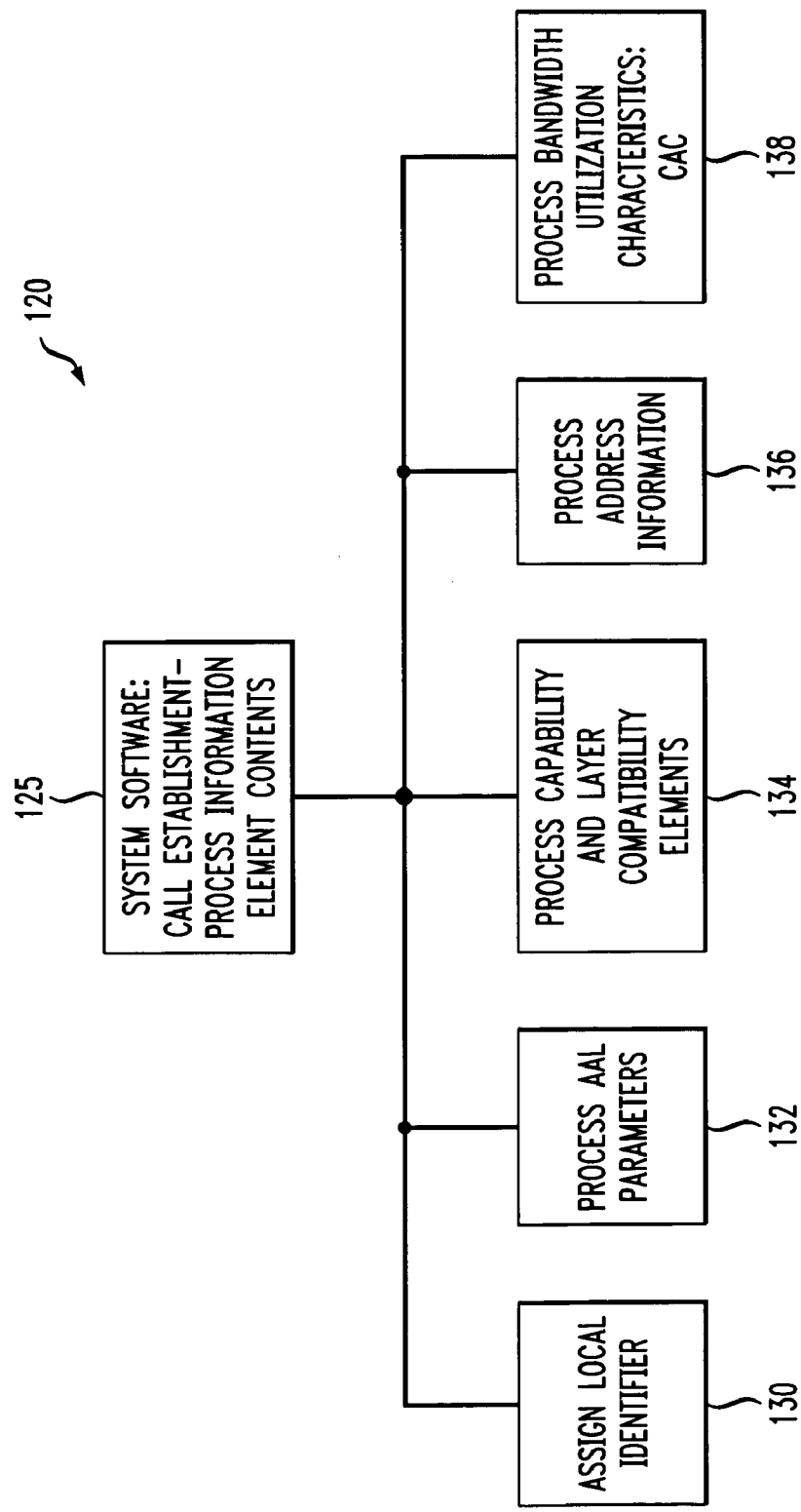
FIG. 1B is a block diagram illustrating an example set of system software that may be implemented in the system of FIG. 1A.

FIG. 1B shows an example set of system software 120 that may be implemented in the system of FIG. 1A. The software 120 provides call processing functions associated with call establishment. More particularly, as indicated in block 125, the system software shown processes information element contents as part of a call establishment phase of operation. This processing in the present example includes the following additional functions:

| | |
|---|---|
| Block 130: | Assign local identifier |
| Block 132: | Process ATM adaptation layer (AAL) parameters |
| Block 134: | Process capability and layer compatibility elements |
| Block 136: | Process address information |
| Block 138: | Process bandwidth utilization characteristics: call admission control (CAC) |

Convention aspects of these processing functions are well known to those skilled in the art and will not be further described herein. Aspects of the present invention that may be implemented in block 138, or elsewhere within system software 120, will be described in greater detail in conjunction with the flow diagrams of FIGS. 2A, 2B and 2C.

Figure 2A:
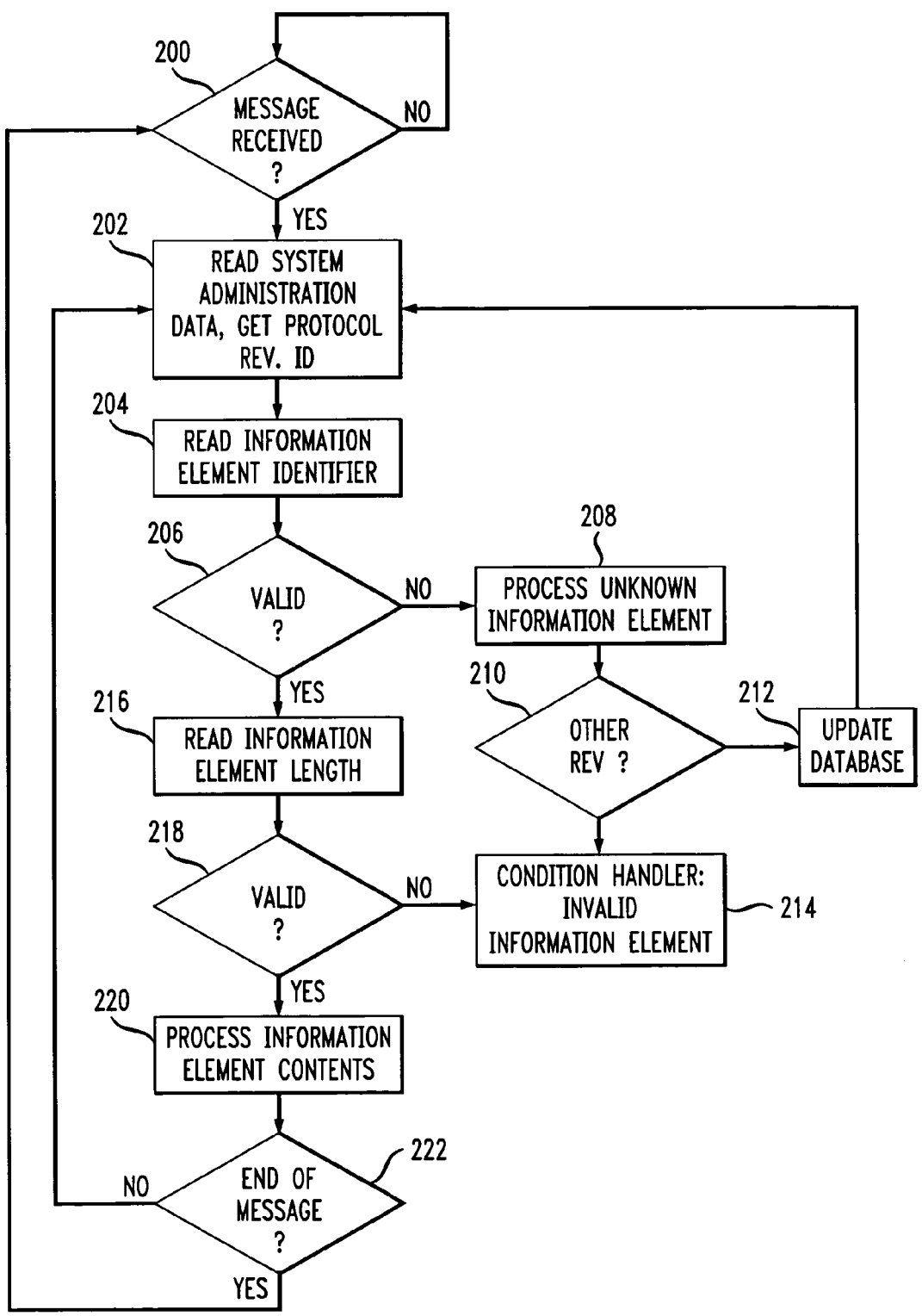
FIG. 2A is a flow diagram showing a message processing function implemented in a version analysis engine of the FIG. 1 A system in accordance with the invention.

FIG. 2A is a flow diagram illustrating the message processing function implemented by the version analysis engine B of switch 102. Step 200 determines if a signaling channel message has been received. If not, the process remains in step 200. If a signaling channel message has been received, the process moves to step 202, which reads system administration data and obtains an identifier of the protocol version associated with a given CPE device 104-i from which the message has been received. In step 204, an information element identifier is read from the signaling channel message. Step 206 then determines if that information element identifier is valid for the protocol version determined in step 202. If not, step 208 processes the information element as an unknown information element. This involves initially determining in step 210 if the information element is associated with another known version of the signaling protocol. If it is, the system database is updated in step 212 to indicate that the other known version of the signaling protocol is now the current protocol to be used in conjunction with the given CPE device 104-i, and the process returns to step 202 to continue monitoring the signaling channel message.

If the information element is determined in step 208 to not be associated with any known version of the protocol, step 214 implements a condition handler to process the information element in a manner similar to that used for invalid information elements in conventional call processing systems.

If the information element identifier read in step 204 is determined in step 206 to be a valid information identifier for the current protocol, step 216 reads the length of the information element, e.g., from a length octet following the identifier octet, and step 218 determines if the length is valid. If not, the process returns to step 214 to implement the above-noted condition handler for an invalid information element. If the length is determined in step 218 to be a valid length, the information element contents are processed in step 220. Step 222 then determines if the signaling channel message has ended, and if so returns to step 200 to await the next message. If the signaling channel message has not ended, the process returns to step 202 for further processing of information element identifiers.

Advantageously, the above-described automatic protocol version detection does not require the exchange of version identifiers or demand/response messages between the CPE devices 104 and the switch 102. Instead, the protocol version is analytically derived from the signaling channel message contents that occur during normal operation. This illustrative embodiment of the invention thus substantially reduces provisioning costs for the system service provider by eliminating the need for conventional manual provisioning.

The call processing reconfiguration aspects of the present invention will now be described in greater detail. As previously noted, the switch 102 in the system 100 of FIG. 1A is configured so as to allow coexistence of CPE devices that each support one of the UNI 3.1 protocol, the UNI 4.0 protocol or a subsequent protocol version (e.g., UNI 4.x, UNI 4.y) in a common communication network. Another significant advantage of this configuration apart from the above-described automatic protocol version detection is that it allows the UNI 3.1 CPE devices to be configured to support a subset of the UNI 4.0 features. For example, the previously-mentioned feature of UNI 4.0 relating to updating of a connection admission control (CAC) function with an actual amount of bandwidth that a particular call instance will use is an important feature that improves bandwidth utilization. Negotiations relating to this feature occur during a call connection establishment phase of call processing. The software of the call processing engine A of switch 102 can be configured to support this feature by modifying otherwise conventional UNI 3.1 call processing engine software to support a number of additional information elements and corresponding functions associated with the UNI 4.0 protocol version. The following is a list of such additional information elements and their corresponding information element identifiers:

| | | | |
|---|---|---|---|
| 1. | Minimum acceptable traffic descriptor | 1000 0001 | (SETUP) |
| 2. | Alternate ATM traffic descriptor | 1000 0010 | (SETUP) |
| 3. | Extended QoS parameters | 1110 1100 | (CONNECT) |
| 4. | End-to-end transit delay | 0100 0010 | (CONNECT) |
| 5. | ABR setup parameters | 1000 0100 | (SETUP) |
| 6. | ABR additional parameters | 1110 0100 | (SETUP) |
| 7. | Narrowband bearer capability | 0000 0100 | |
| 8. | Progress indicator | 0001 1110 | |
| 9. | Notification indicator | 0010 0111 | |
| 10. | Connected number | 0100 1100 | |
| 11. | Connected subaddress | 0100 1101 | |

-continued

| | | |
|---|---|---|
| 12. | Narrowband low layer compatibility | 0111 1100 |
| 13. | Narrowband highlayer compatibility | 0111 1101 |
| 14. | Generic identifier transport | 0111 1111 |
| 15. | Leaf initiated join call identifier | 1110 1000 |
| 16. | Leaf initiated join parameters | 1110 1001 |
| 17. | Leaf sequence number | 1110 1010 |
| 18. | Connection scope selection | 1110 1011 |

Each of the information element identifiers shown above are each in the form of an octet (eight bits). The particular elements associated with SETUP and CONNECT messages are designated parenthetically as such. In the foregoing list, QoS denotes "quality of service" and ABR denotes "available bit rate."

A given information element identifier octet is generally followed by the above-noted length octet, which specifies the number of additional data-carrying octets that follow the length octet. The data in these additional octets is interpreted in a conventional manner in accordance with the appropriate UNI reference specification.

Additional details regarding the above-noted information elements and the interpretation thereof can be found in the above-cited ATM Forum UNI 3.1 and UNI 4.0 specifications.

A given UNI 3.1 CPE device, e.g., device 104-1 or device 104-N in system 100 of FIG. 1A, can be configured in accordance with the present invention to support the above-noted additional information elements of UNI 4.0 that allow it to implement the bandwidth negotiation. When a call is initiated from such a device, it may obtain the additional information elements through interaction with the switch 102. When the call is accepted by another CPE device supporting UNI 4.0 or the expanded version of UNI 3.1, that device will send back to the calling device a CONNECT message with the accepted traffic parameters of the call. The calling device can then use these parameters to perform any necessary reconfiguration to support the call.

Figure 2B:
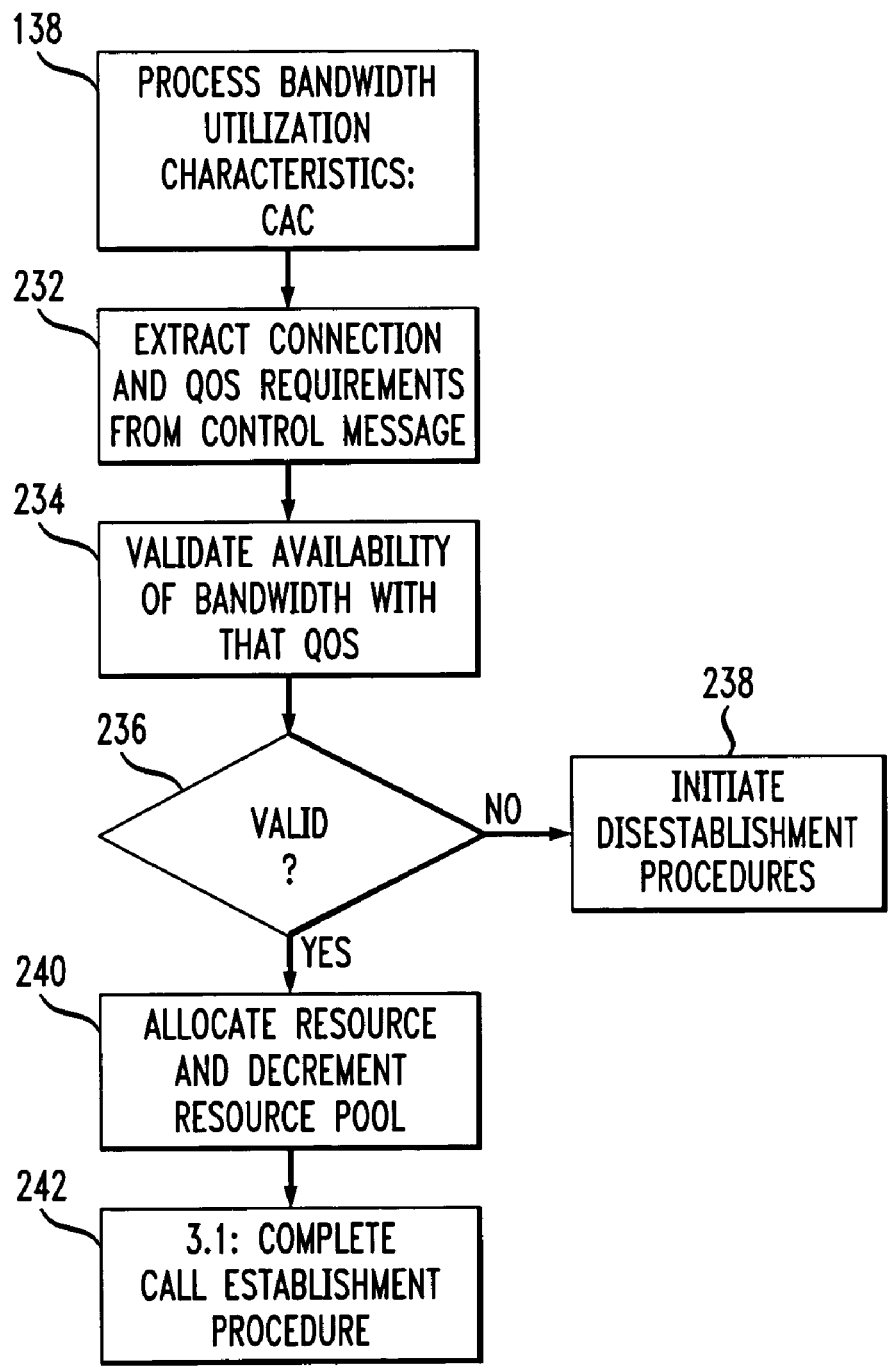
FIGS. 2B and 2C are flow diagrams illustrating connection admission control (CAC) operations of the FIG. 1B system software in accordance with the invention.
Figure 2C:
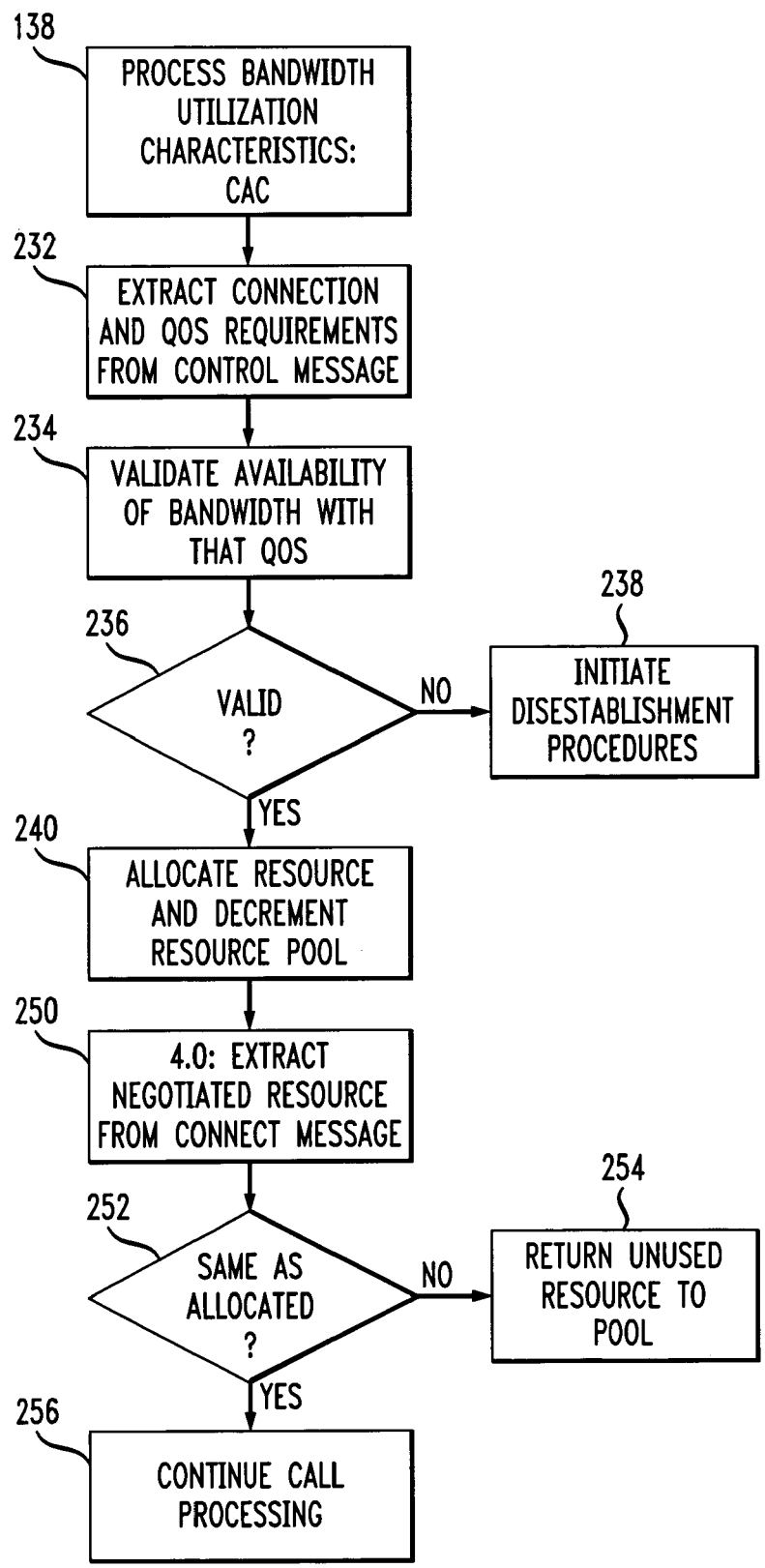

FIGS. 2B and 2C illustrate example connection admission control (CAC) operations of the FIG. 1B system software 120 in accordance with the invention. FIG. 2C illustrates the manner in which call processing for a UNI 3.1 protocol as shown in FIG. 2B is reconfigured so as to support a UNI 4.0 protocol, in accordance with the techniques of the invention. The processing operations shown in FIGS. 2B and 2C may be implemented in block 138 of the system software 120, or elsewhere in the system 100.

Referring initially to FIG. 2B, block 138 is shown as including steps 232 through 242 for call processing in accordance with a UNI 3.1 protocol. The call processing software 120 in step 232 extracts connection and QoS requirements from a control message received in the switch 102 from one of the CPE 104-i. Step 234 attempts to validate that there are sufficient bandwidth resources at the required QoS to establish the requested connection. Step 236 determines if the requested connection has been validated. If the requested connection is not valid, e.g., because there are insufficient resources available, conventional call disestablishment procedures are initiated in step 238. If the requested connection is valid, the system allocates the requested resources, while removing the allocated resources from a pool of available resources, as indicated in step 240. The call establishment procedure is then completed in accordance with the UNI 3.1 protocol.

Referring now to FIG. 2C, block 138 of the system software 120 is reconfigured in accordance with the invention to support the UNI 4.0 protocol for a given CPE 104-i coupled to the switch 102. It is assumed that the protocol version detection process of FIG. 2A has previously been executed for the given CPE, and that the result of that process indicates that the given CPE can support the UNI 4.0 protocol. A first portion of the FIG. 2C process includes steps 232 through 240 of the FIG. 2B process, configured in the manner described previously. Following step 240 of FIG. 2C, step 250 operates in accordance with the UNI 4.0 protocol to extract a negotiated resource from a CONNECT message. Step 252 then determines if the extracted negotiated resource is the same as that which is allocated. If not, any unused resource is returned to the pool of available resources, and the processing ends, as indicated in step 254. If the extracted negotiated resource is the same as that which is allocated, the processing continues, as indicated in step 256.

As is apparent from the foregoing, the call processing operations shown in FIG. 2C have been reconfigured relative to those shown in FIG. 2B in order to include functions that support bandwidth negotiations in accordance with UNI 4.0. In this embodiment, the system software is configured so as to be capable of extracting follow-up information from the control message stream (e.g., from one or more CONNECT messages). This information is then used to determine if the call has been accepted with the system resources originally dedicated to that call instance, or if the resources have been reduced through the negotiation procedure. If the former has occurred, no changes are made to the resource pool, but if the latter has occurred, the system software will adjust the resource pool, thus making additional resources available for other users. It should be noted that if the original system profile for the given CPE 104-i had been restricted to UNI 3.1, and not reconfigured for support of UNI 4.0, a far-end bandwidth limitation may have caused the call attempt to be rejected due to lack of resources. In that case, additional call attempts would generally have to be launched in order to effectively "poll" for an acceptable amount of resources.

Another example of a possible implementation of the invention will now be described with reference to FIGS. 3 and 4.

Figure 3:
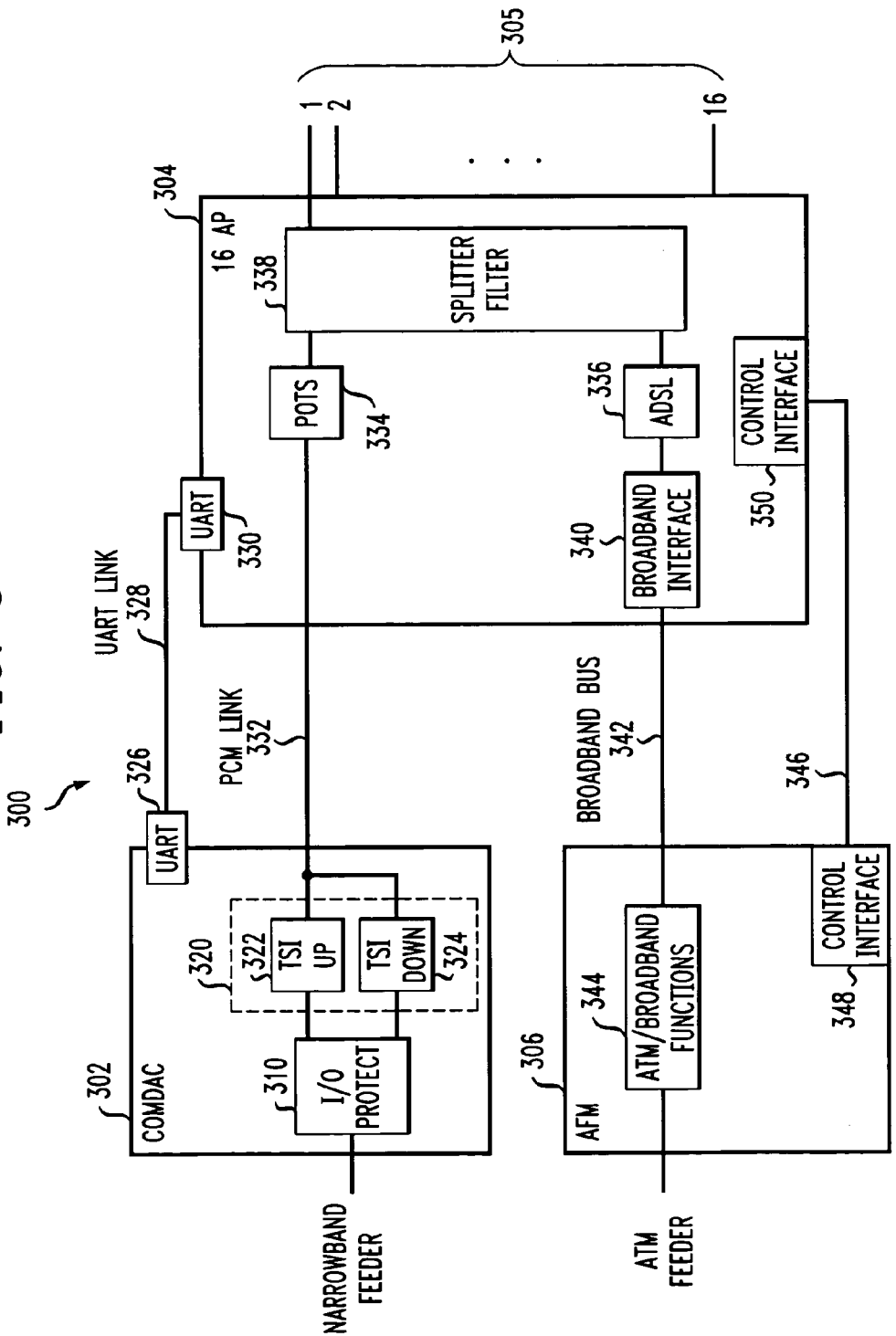
FIG. 3 shows a more detailed view of a portion of another exemplary communication system in which the invention is implemented.

FIG. 3 shows a portion of a communication system 300 in which the present invention is implemented. The portion of the system 300 shown in FIG. 3 may represent a communication system switch, such as the switch 102 previously described in conjunction with FIG. 1A. The system 300 includes a combined data and control unit (COMDAC) 302, a 16-port application pack (AP) 304 supporting a set 305 of sixteen ADSL lines, and an ATM feeder multiplexer (AFM) 306. The COMDAC 302 provides sub-rate connectivity to a narrowband feeder which may carry, e.g., conventional DS0 signals, and includes an input/output (I/O) and protection unit 310 and a processor 320. The processor 320 includes time slot interchange (TSI) up and down units 322 and 324, respectively. The COMDAC 302 communicates with the AP 304 via a universal asynchronous receiver/transmitter (UART) 326 that is coupled via a UART link 328 to a UART 330 of the AP 304. The TSI up and down units communicate via a sub-rate pulse coded modulation (PCM) link 332 with a POTS transceiver 334 of the AP 304. The POTS transceiver 334 converts PCM signals received from COMDAC 302 to analog format for delivery over the ADSL lines 305, and converts analog signals received from the ADSL lines 305 to PCM formal for delivery to the COMDAC 302. The POTS transceiver 334 and an ADSL transceiver 336 are coupled to a splitter and filter unit 338 which is coupled to the ADSL lines 305.

The ADSL transceiver 336 communicates via a broadband interface 340 over a broadband bus 342 with an ATM/broadband functions unit 344 of the AFM 306. The ATM/broadband functions unit 344 receives ATM cells from and delivers ATM cells to an ATM feeder, which may represent a conventional OC-3 link or more generally an OC-x link. The AFM 306 also communicates with the AP 304 via an internal interface controller link 346 between a control interface 348 of the AFM 306 and a control interface 350 of the AP 304.

As previously noted, the portion of the communication system 300 shown in FIG. 3 may be viewed as a communication system switch. Such a switch may be located between, e.g., a central office of the system and one or more business or residential customers each of which may be associated with one or more of the ADSL lines 305. These customers may have CPE devices with different signaling protocol versions as illustrated in FIG. 1A. Although a 16-port AP is used in this embodiment, other embodiments may include multiple APs and/or APs providing support for different numbers of ADSL lines.

The present invention in the embodiment of FIG. 3 is implemented in the ATM/broadband functions unit 344 of the AFM 306. More particularly, the unit 344 of the AFM 306 is configured in accordance with the invention to provide the automatic protocol version detection and call processing reconfiguration operations described previously in conjunction with FIGS. 1 and 2.

Figure 4:
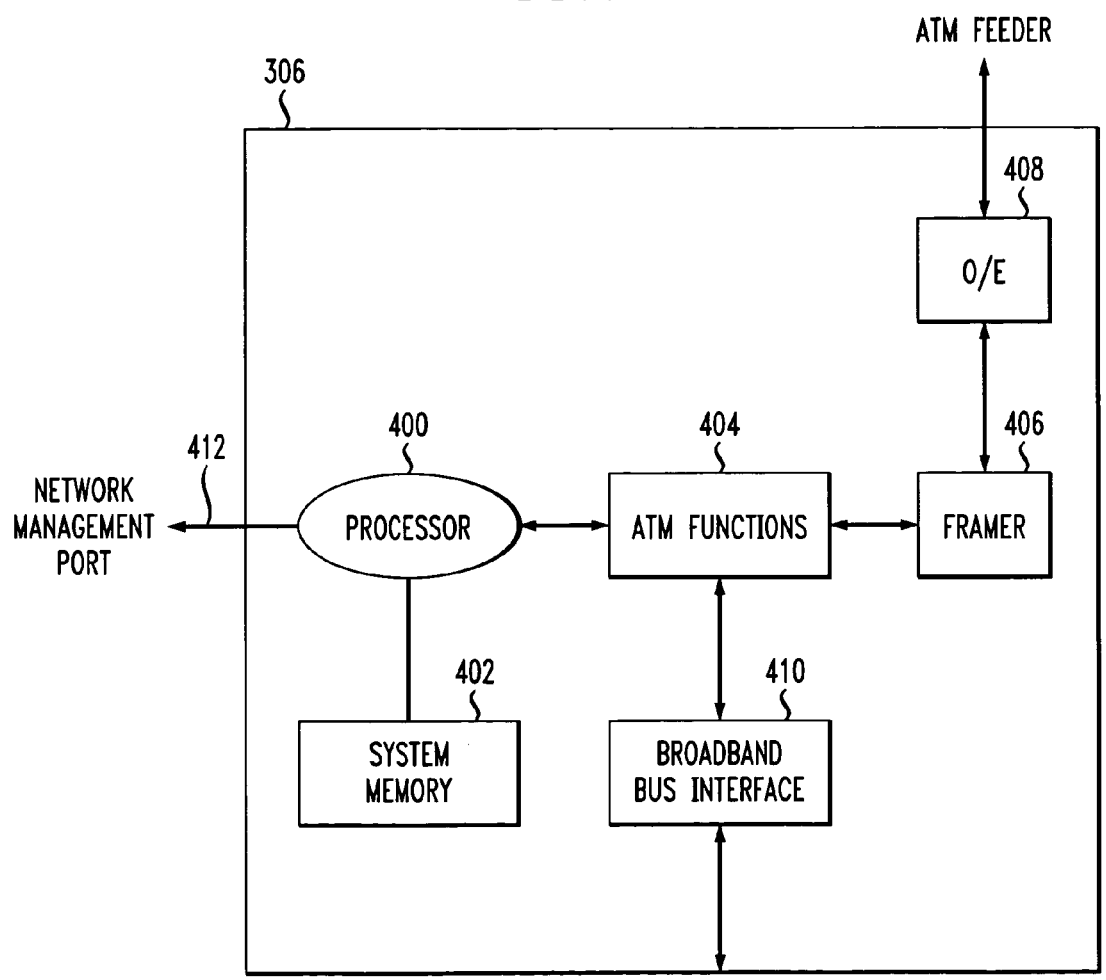
FIG. 4 is a block diagram of an ATM feeder multiplexer of the system of FIG. 3, configured in accordance with the invention.

FIG. 4 shows the ATM/broadband functions unit 344 of the AFM 306 in greater detail. The unit 344 as shown includes a processor 400, a system memory 402, an ATM functions unit 404, a framer 406, an optical/electrical (O/E) interface 408, and a broadband bus interface 410.

The processor 400 serves as a primary computation engine for the AFM 306, and may be implemented as a single device or as a set of devices. For example, the processor 400 may represent one or more microprocessors, central processing units (CPUs), application-specific integrated circuits (ASICs), as well as suitable portions or combinations of these and other devices. The processor 400 executes software for system management, protocol processing, connection admission control, etc. More particularly, the processor 400 may be configured to execute software for implementing the processing engines A and B of FIG. 1A, including the signaling channel message processing of FIG. 2A and the CAC-related processing of FIGS. 2B and 2C. The processor 400 is coupled to network management port 412 which may be used to input data to configure the system. It should be noted that the presence of this port does not preclude use of the above-noted ATM Feeder to transport network management data, such as MIBs sent via the Integrated Local Management Information (ILMI) protocol.

The system memory 402 stores the software executed by the processor 400, as well as configuration information, run time information, information comprising the system database 110 of FIG. 1A, etc. The system memory may include both volatile and non-volatile memory, and may be implemented using conventional electronic, magnetic or optical storage devices or portions or combinations of these and other devices.

The ATM functions unit 404 is a device performing such conventional ATM-related functions as segmentation and reassembly (SAR), buffer management and line management.

The framer 406 frames data provided by the ATM functions unit 404 into a format suitable for the ATM feeder transport type.

The O/E interface 408 converts optical signals received from the ATM feeder to electrical signals for processing in the AFM 306, and converts electrical signals processed in the AFM 306 to optical signals for transmission to the ATM feeder.

The broadband bus interface 410 interfaces via the broadband bus 342 of FIG. 3 to the corresponding broadband interface 340 of the AP 304. This allows the broadband functions of the AFM 306 to be coordinated with those of the AP 304.

The conventional aspects of the operation of certain elements shown in FIGS. 3 and 4 are well understood in the art and therefore not described in detail herein. For example, additional details regarding the ATM communication aspects of the system 300 may be found in, e.g., the above-cited ATM Forum UNI 3.1 and UNI 4.0 specifications, and in Martin de Prycker, "Asynchronous Transfer Mode: Solution for Broadband ISDN," Ellis Horwood, New York, 1993, both of which are incorporated by reference herein.

The above-described system implementations are shown by way of example only. Those skilled in the art will recognize that the invention can be used with other configurations of elements as required for a particular application. For example, the invention can be used to provide automatic version detection and corresponding call processing reconfiguration for communication protocols other than the ATM UNI protocols of the illustrative embodiments.

Although the above-described illustrative embodiments are particularly well suited for use in transmission applications involving ATM transmitted over DSL network connections, the invention can also be implemented in other types of communication systems including, for example, Frame Relay systems, IP systems, or in conjunction with any other type of encapsulation technique. In addition, the invention can be used with other types of transport mechanisms and communication links.

Moreover, although illustrated in conjunction with CPE devices, the invention is applicable to other types of devices attached to or otherwise associated with a network communication link. For example, the invention may be implemented in a network server, so as to provide appropriate protocol version detection and configuration to allow the server to communicate with another device over a particular type of communication link.

It will be recognized that many alternative configurations are possible for systems 100 and 300, e.g., using elements other than those shown in FIGS. 1, 3 and 4, and it should be understood that the invention is not restricted to use with any particular system configuration. The term "processor" as used herein is intended to include any arrangement of one or more processing devices configured to provide automatic protocol version determination and/or call processing reconfiguration in the manner described above.

As previously noted, the present invention can be implemented in whole or in part in software stored on a machine-readable medium, e.g., an optical or magnetic disk, a disk-based storage device, an electronic memory, etc., and executed by a processor associated with a communication switch or other similar element or set of elements of a communication system.

It should again be emphasized that the above-described embodiments of the invention are intended to be illustrative only. Other embodiments may, e.g., incorporate software to implement policy-based decisions that operate in conjunction with the automatic protocol version detection. For example, such a policy-based decision may dictate that a call processing reconfiguration not be implemented for a given CPE unless a corresponding customer has subscribed to the associated feature(s). These and numerous alternative embodiments within the scope of the following claims will be apparent to those skilled in the art.

What is claimed is:

1. A method for configuring a first device of a communication system, the method comprising the steps of:
   receiving at least one message in the first device from a second device of the communication system;
   determining if a protocol version of the at least one message is the same as a protocol version associated with the second device in a memory of the first device;
   determining if the protocol version of the at least one message is a known protocol version when the protocol version of the at least one message is not the same, and updating the protocol version associated with the second device in the memory of the first device when the protocol version of the at least one message is known; and
   processing the at least one message at the first device when the protocol version of the at least one message is the same.

2. The method of claim 1 wherein the first device comprises a switch of the communication system.

3. The method of claim 1 wherein the second device comprises a customer premises equipment (CPE) device of the communication system.

4. The method of claim 1 wherein the protocol comprises an asynchronous transfer mode (ATM) user-network interface (UNI) protocol.

5. The method of claim 1 wherein the at least one message analyzed to determine the particular version of the protocol comprises a signaling channel message received over a signaling channel established between the first and second devices.

6. The method of claim 1 wherein the step of determining if a protocol version of the at least one message is the same as a protocol version associated with the second device in a memory of the first device further comprises the step of determining if an information element identifier extracted from the at least one message is a valid information element identifier for the protocol version associated with the second device in a memory of the first device.

7. The method of claim 1 wherein a call processing function of the first device is adjusted so as to provide a feature associated with the particular version of the protocol.

8. An apparatus for use in configuring a first device of a communication system, the apparatus comprising:
   a memory;
   at least one processor coupled to the memory, associated with the first device and operative to: (i) receive at least one message in the first device from a second device of the communication system; (ii) determine if a protocol version of the at least one message is the same as a protocol version associated with the second device in a memory of the first device; (iii) determine if the protocol version of the at least one message is a known protocol version when the protocol version of the at least one message is not the same, and update the protocol version associated with the second device in the memory of the first device when the protocol version of the at least one message is known; and (iv) process the at least one message at the first device when the protocol version of the at least one message is the same.

9. The apparatus of claim 8 wherein the first device comprises a switch of the communication system.

10. The apparatus of claim 8 wherein the second device comprises a customer premises equipment (CPE) device of the communication system.

11. The apparatus of claim 8 wherein the protocol comprises an asynchronous transfer mode (ATM) user-network interface (UNI) protocol.

12. The apparatus of claim 8 wherein the at least one message analyzed to determine the particular version of the protocol comprises a signaling channel message received over a signaling channel established between the first and second devices.

13. The apparatus of claim 8 wherein the step of determining if a protocol version of the at least one message is the same as a protocol version associated with the second device in a memory of the first device further comprises the step of determining if an information element identifier extracted from the at least one message is a valid information element identifier for the protocol version associated with the second device in a memory of the first device.

14. The apparatus of claim 8 wherein a call processing function of the first device is adjusted so as to provide a feature associated with the particular version of the protocol.

15. A machine-readable medium storing one or more programs for configuring a first device of a communication system, wherein the one or more programs when executed by a processor implement the steps of:
   receiving at least one message in the first device from a second device of the communication system;
   determining if a protocol version of the at least one message is the same as a protocol version associated with the second device in a memory of the first device;
   determining if the protocol version of the at least one message is a known protocol version when the protocol version of the at least one message is not the same, and updating the protocol version associated with the second device in the memory of the first device when the protocol version of the at least one message is known; and
   processing the at least one message at the first device when the protocol version of the at least one message is the same.

16. A method for configuring a first device of a communication system, the method comprising the steps of:
   receiving at least one message in the first device from a second device of the communication system;
   determining if an information element identifier extracted from the at least one message is a valid information element identifier for a protocol version associated with the second device in a memory of the first device;
   determining if the extracted information element identifier is a valid information element identifier for another protocol version when the extracted information element identifier is not valid for a protocol version associated with the second device, and updating the protocol version associated with the second device in the memory of the first device when the extracted information element identifier is valid for another protocol version;

processing the message at the first device when the extracted information element identifier is valid for a protocol version associated with the second device.

* * * * *